United States Patent [19]

Kokado

[11] 3,925,613

[45] Dec. 9, 1975

[54] APPARATUS FOR EXTRACTING A VERTICAL SYNCHRONIZING PULSE FROM A COMPOSITE SYNCHRONIZING SIGNAL INCLUDED IN A VIDEO SIGNAL

[75] Inventor: Naoyuki Kokado, Tokyo, Japan

[73] Assignee: Tokyo Shibaura Electric Co., Ltd., Kawasaki, Japan

[22] Filed: June 7, 1974

[21] Appl. No.: 477,287

[30] Foreign Application Priority Data

June 19, 1973 Japan ................................ 48-68287

[52] U.S. Cl......... 178/69.5 TV; 178/7.3 S; 328/139

[51] Int. Cl.[2]............................................ H04L 7/00

[58] Field of Search..... 178/69.5 R, 69.5 TV, 7.3 S, 178/7.5 S; 328/139

[56] References Cited

UNITED STATES PATENTS

| | | | |
|---|---|---|---|
| 3,678,199 | 7/1972 | Brown | 328/139 |
| 3,809,809 | 5/1974 | Vidovic | 178/69.5 TV |
| 3,814,855 | 6/1974 | Kokado | 178/69.5 TV |

*Primary Examiner*—Malcolm A. Morrison
*Assistant Examiner*—Errol A. Krass
*Attorney, Agent, or Firm*—Oblon, Fisher, Spivak, McClelland & Maier

[57] ABSTRACT

An apparatus for extracting a vertical synchronizing pulse from a composite synchronizing signal which comprises a device for regenerating a vertical synchronizing pulse in a continuous form by equally broadening the width of the respective input pulses to an extent at least larger than the width of the respective splits by which the vertical synchronizing pulse included in a composite synchronizing signal separated from a video signal was previously divided at a time interval equal to half the period of the horizontal synchronizing pulse, thereby obtaining a regenerated composite synchronizing signal; and a device for extracting a vertical synchronizing pulse from said regenerated vertical synchronizing pulse.

5 Claims, 9 Drawing Figures

APPARATUS FOR EXTRACTING A VERTICAL SYNCHRONIZING PULSE FROM A COMPOSITE SYNCHRONIZING SIGNAL INCLUDED IN A VIDEO SIGNAL

This invention relates to an apparatus for extracting a vertical synchronizing pulse from a composite synchronizing signal separated from a video signal.

With a television receiving set, a composite synchronizing signal is first separated from a video signal received by the known synchronizing separating circuit. This composite synchronizing pulse includes a vertical synchronizing pulse, horizontal synchronizing pulse and an equalizing pulse for effectively attaining interrace scanning. Of these synchronizing pulses, the vertical synchronizing pulse has a component of lower frequency than the other synchronizing pulse and is readily affected by noises. To avoid such drawbacks, each vertical synchronizing pulse is divided by splits at a time interval equal to half the period of a horizontal synchronizing pulse. The width of the split by which the vertical synchronizing pulse is divided is chosen to be about 2.5 microseconds under the rule of the National Television System Committee (NTSC). Hitherto, separation of a vertical synchronizing pulse from a composite synchronizing signal has been carried out, as already known, by supplying the composite synchronizing signal to an integration circuit, slicing an integrated wave form at a prescribed level, and shaping a wave form having a lower level than said slicing level.

However, in a weak electrical field, or a field much affected by noises, it sometimes happens that a vertical synchronizing pulse component is cracked or, in an extreme case, the cracked component is partially lost. Under such condition, an output from the integration circuit is too small to reach a slicing level, giving rise to nonsynchronization on a screen due to failure to defect the vertical synchronizing pulse. Even where an output from the integration circuit reaches a slicing level, variation takes place in a phase at a slicing point, causing the shaped wave form, namely, the separated vertical synchronizing pulse and a vertical synchronizing pulse included in a video signal to rise at different points of time. In other words, both vertical synchronizing pulses rise with different phases. This event presents difficulties in effecting complete interrace scanning.

It is accordingly the object of this invention to provide an apparatus capable of regenerating a vertical synchronizing pulse free from the above-mentioned defects even when a vertical synchronization pulse component included in a composite synchronizing signal separated from a video signal is cracked or partially lost.

The apparatus of this invention comprises a synchronizing signal separating circuit for separating a composite synchronizing signal from a video signal; and a device for providing a regenerated composite synchronizing signal by equally broadening the width of the respective pulses included in the composite synchronizing signal to an extent at least larger than the width of the respective splits by which the vertical synchronizing pulse included in the composite synchronizing signal was previously divided at a time interval equal to half the period of the horizontal synchronizing pulse also contained in the composite synchronizing signal, thereby converting the vertical synchronizing pulse divided by the splits into a continuous form.

The above-mentioned regenerated composite synchronizing signal is obtained by supplying the composite synchronizing signal separated from a video signal and a first clock pulse to a first counter circuit to count a prescribed number of first clock pulses starting with the fall of the respective synchronizing pulses included in said composite synchronizing signal and broadening the width of said respective synchronizing pulses to an extent corresponding to the counted value. The regenerated synchronizing signal is also obtained using a multivibrator circuit which is driven at the fall of the respective synchronizing pulses to generate pulses bearing a prescribed width.

The vertical synchronizing pulse included in the regenerated composite synchronizing signal is obtained using a second counter for commencing the counting of second clock pulses when a pulse of the regenerated composite synchronizing signal is received and an AND circuit for producing a synchronizing pulse simultaneously with the regenerated vertical synchronizing pulse when the second counter has counted a prescribed number of second clock pulses.

Even where any of the vertical synchronizing pulse components included in a composite synchronizing signal is cracked in a weak electrical field, the apparatus of this invention converts these plural vertical synchronizing pulse components into a single continuous vertical synchronizing pulse bearing a prescribed width, thereby providing a vertical synchronizing pulse whose phase substantially coincides with that of a transmitting vertical synchronizing pulse.

This invention can be more fully understood from the following detailed description when taken in conjunction with the accompanying drawings, in which.

Throughout the following description, elements such as ANd and OR represent logical AND and logical OR elements respectively.

Figure 1:
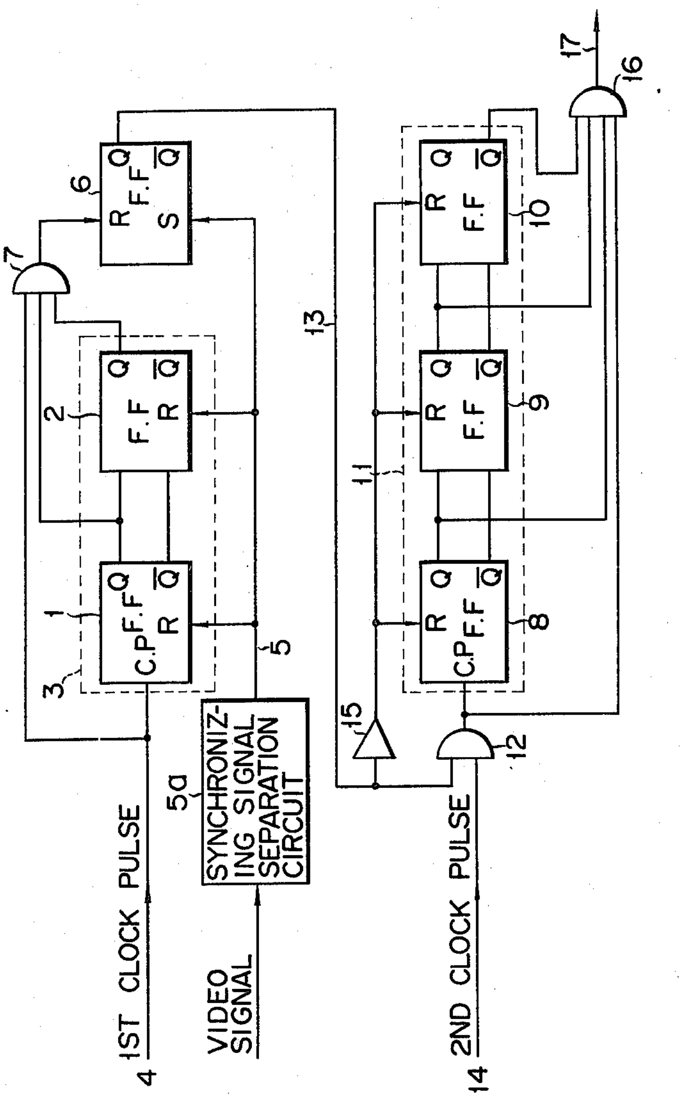
FIG. 1 is a block diagram representative of an embodiment according to the invention.

Referring to FIG. 1, there is provided a first counter circuit 3 consisting of a first flip-flop circuit 1 and a second flip-flop circuit 2 connected to each other in series. The clock pulse terminal CP of the first flip-flop circuit 1 included in the first counter circuit 3 is supplied with a first clock pulse 4 having a frequency of, for example, 204 KHz. On the other hand, a video signal received is supplied to a known synchronizing signal-separating circuit 5*a*. A composite synchronizing signal thus separated is conducted to the reset terminals R of the first and second flip-flop circuits 1, 2 and also to the set terminal S of the later described set-reset flip-flop circuit 6. The first clock pulse 4, an output from the set output terminal Q of the first flip-flop circuit and an output from the set output terminal Q of the second flip-flop circuit are supplied to an AND circuit 7, or a reset circuit, an output from which is conducted to the reset terminal R of the flip-flop circuit 6.

The subject apparatus further includes a second counter circuit 11 consisting of flip-flop circuits 8, 9, 10 and an AND circuit 12. This AND circuit 12 is supplied with an output 13 from the set ouput terminal Q of the flip-flop circuit 6 and a second clock pulse of, for example, 31.5 kHz. An output from the AND circuit 12 is transmitted to the clock pulse terminal CP of the flip-flop circuit 8. The output 13 from the set output terminal Q of the flip-flop circuit 6 is also delivered through an inverter 15 to the reset teminals R of the flip-flop circuits 8, 9, 10 respectively. An AND circuit 16 is supplied with an ouptut from the AND circuit 12, outputs from the set output terminals Q of the flip-flop circuits 8, 9 respectively and an output from the reset output terminal $\overline{Q}$ of the flip-flop circuit 10. A desired vertical synchronizing pulse 17 is delivered from the AND circuit 16.

Figures 2A, 2B, 2C, 2D, 2E:
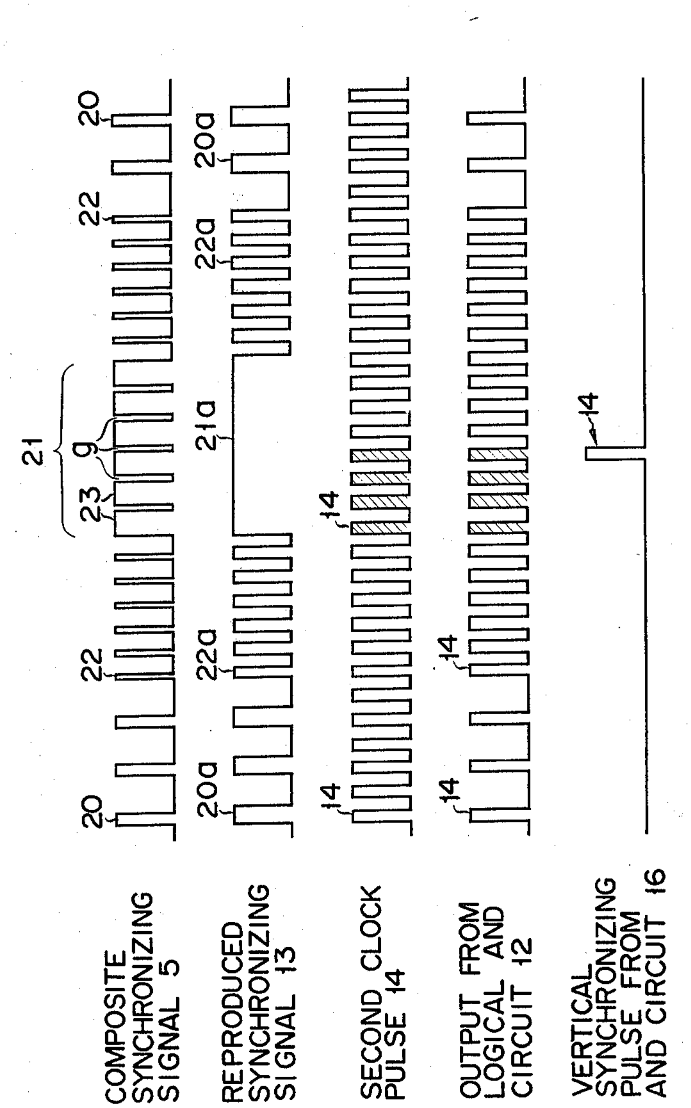
FIGS. 2A-2E shows conceptional wave forms for explaining the operation of the embodiment shown in FIG. 1.
Figure 3:
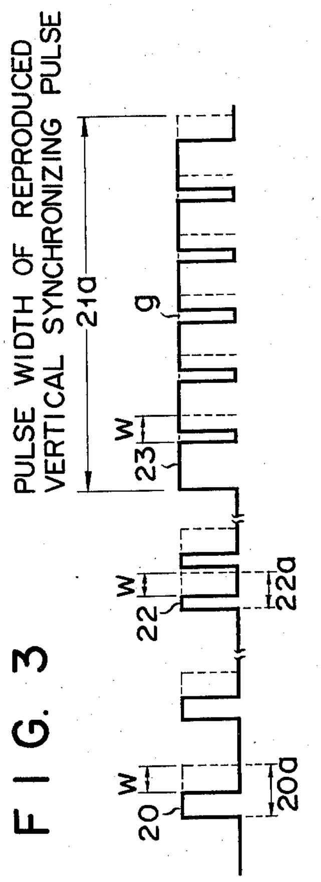
FIG. 3 represents an explanatory wave form which shows the manner in which each synchronizing pulse shown in FIG. 2 has its width broadened.

There will now be described by reference to FIGS. 2 and 3 the operation of the entire circuitry of FIG. 1. A composite synchronizing signal 5 from a synchronizing signal-separating circuit 5*a* comprises, as shown in FIG. 2A, a horizontal synchronizing pulse 20 having a width of about 4.9 microseconds, vertical synchronizing pulse 21 and two groups each consisting of six equalizing pulses 22 generated before and after said vertical synchronizing pulse 21. The vertical synchronizing pulse 21 s divided into six components 23 by splits *g* having a width of about 2.5 microseconds.

The first counter circuit 3 is reset at the rise of the respective synchronizing pulses constituting the composite synchronizing signal 5 and begins to count first clock pulses 4 starting with the fall of said respective synchronizing pulses. When the first counter circuit 3 has counted four first clock pulses 4, then the AND circuit 7 has all its input terminals brought to a level of "1" and supplies a reset signal to the flip-flop circuit 6. This flip-flop circuit 6 gives forth an output pulse 13 which rises at the rise of the respective synchronizing pulses of the composite synchronizing signal 5 and continues, until said flip-flop circuit 6 is reset as described above. Obviously, therefore, said respective synchronizing pulses (FIG. 2A) have the width broadened, as illustrated in dotted lines in FIG. 3, equally to an extent *w* corresponding to a length of time required for the first counter circuit 3 to count four first clock pulses 4. The width *w* to be broadened is chosen to be at least larger than the width of the splits g by which the respective adjacent vertical synchronizing pulse components 23 of the vertical synchronizing pulse 21 are separated from each other. Thus, the previously divided vertical synchronizing pulse 21 is reproduced into a single continuous form 21*a* (this continuous form is hereinafter referred to as a reproduced vertical synchronizing pulse).

The horizontal synchronizing pulse 20 and equalizing pulse 22 are also given forth as a reproduced horizontal synchronizing pulse 20*a* and reproduced equalizing pulse 22*a*, each having the width broadened equally to the extent *w*.

A reproduced composite synchronizing signal 13 consisting of the reproduced synchronizing pulses is shown in FIG. 2B.

While the reproduced composite synchronizing signal 13 may be used intact for a composite synchronizing signal of ordinary television, there will further be described as the case where the reproduced vertical synchronizing pulse is separated from said reproduced composite synchronizing signal 13. The AND circuit 12 supplies a second clock pulse 14 to the CP teminal of the flip-flop circuit 8 only while the respective synchronizing pulses of the reproduced composite synchronizing signal 13 maintain a level of "1." As the result, the second counter circuit 11 counts said second clock pulses 14 thus supplied, but is reset at the fall of the respective synchronizing pulses of the reproduced composite synchronizing signal 13 upon receipt of an output from the inverter 15. The input terminals of the AND circuit 16 connected to the second counter circuit 11 as illustrated in FIG. 1 present a level of "1" only when the second counter circuit 11 has counted four second clock pulses 14, thereby generating a desired vertical synchronizing pulse 17. Since, however, the reproduced horizontal pulses 20*a* and reproduced equalizing pulses 22*a* respectively have a narrow width, the second counter circuit 11 is reset by an output from the inverter 15 before it counts four second clock pulses 14. Accordingly, it is only when the AND circuit 12 is supplied with the reproduced vertical synchronizing pulse 21*a* that the AND circuit 16 gives forth a desired vertical clock pulse 17 upon the counting of four second clock pulses 14 by the second counter circuit 11. This fact is schematically illustrated by FIGS. 2B and 2D. Namely, when phase coincidence takes place between the reproduced horizontal synchronizing pulses 20*a* and some of the second clock pulses 14, or between the reproduced equalizing pulses 22*a* and some of the second clock pulses 14, then the AND circuit 12 gives forth second clock pulses 14 (FIG. 2D). Since, however, the number of second clock pulses 14 obtained during the period of the above-mentioned coincidence does not amount to four, the AND circuit 16 does not produce a desired vertical synchronizing pulse 17. With respect to the reproduced vertical synchronizing pulse 21*a* which now has its width broadened, more than four second clock pulses 14 can pass through the AND circuit 12 (FIG. 2D). Accordingly, the AND circuit 16 gives forth the fourth second clock pulse 14 as measured from the time when the second counter circuit 11 commences counting. The second clock pulse 14 of FIG. 2E which synchronizes with the vertical synchronizing pulse 21 can be used as a desired vertical synchronizing pulse.

Figure 4:
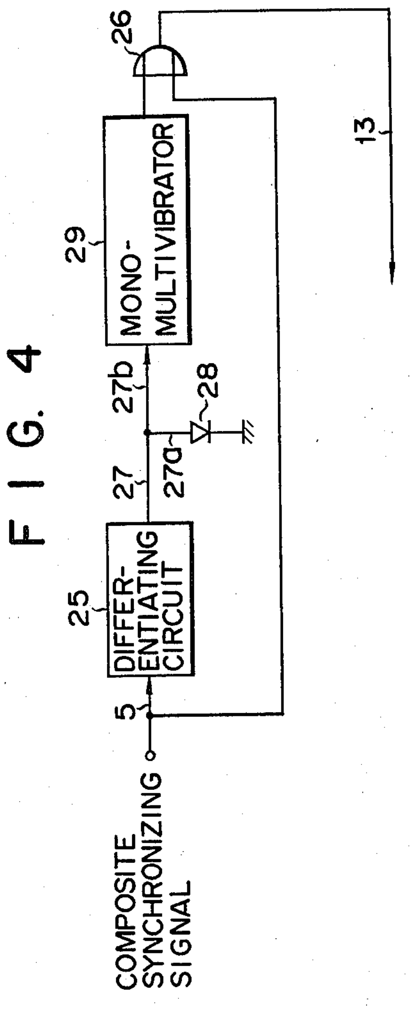
FIG. 4 is a block diagram representative of another embodiment according to the invention.
Figure 5:
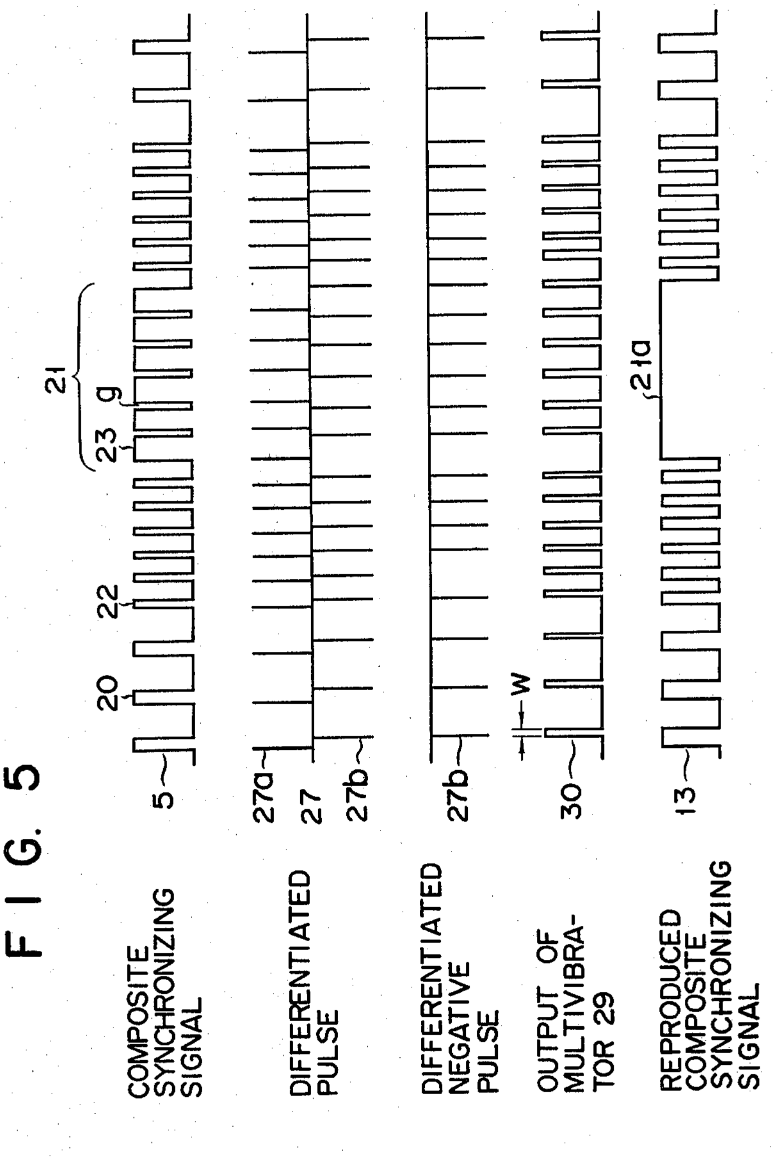
FIG. 5 represents wave forms for explaining the operation of the circuit shown in FIG. 4.

The above-mentioned reproduced composite synchronizing signal 13 can also be obtained using a monomultivibrator. Referring to FIGS. 4 and 5, the composite synchronizing signal 5 is supplied to a differentiating circuit 25 and also to one of the input terminals of an OR circuit 26. Of the outputs 27 a positive differentiated output 27*a* corresponding to the rise of the respective synchronizing pulses of the composite synchronizing signal 5 is grounded through a diode 28 and only a negative differentiated output 27*b* is delivered to a monomultivibrator 29. When supplied with the negative differentiated output 27*b*, the monomultivibrator 29 is operated to deliver a pulse 30 having the width *w* previously described by reference to FIG. 3 to the other input terminal of the OR circuit 26. Obviously, therefore, the OR circuit 26 can generate a reproduced composite synchronizing signal 13 containing a reproduced vertical synchronizing pulse 21*a* converted into a continuous form.

The above-mentioned reproduced composite synchronizing signal can also have its vertical synchronizing pulse extracted by supplying said reproduced composite signal to an integration circuit using the prior art, slicing a resultant integration output at a proper level and shaping wave forms below said level. The previously described frequencies of the first and second clock pulses are not limited to those given in this embodiment. However, clock pulses bearing said frequencies are easily obtained from the color subcarrier generator used in a color television receiving set.

What is claimed:

1. An apparatus for extracting a vertical synchronizing pulse from a composite synchronizing signal included in a video signal, comprising a synchronizing signal-separating circuit for separating a composite synchronizing signal from a video signal; a device for providing a reproduced composite synchronizing signal which comprises a first counter circuit supplied with the composite synchronizing signal and first clock pulses, reset at the rise of the respective synchronizing pulses constituting the composite synchronizing signal and designed to commence the counting of the first clock pulses starting with the fall of the respective synchronizing pulses; a reset circuit connected to the first counter circuit so as to give forth a reset output when the first counter circuit has counted a prescribed number of the first clock pulses, and a flip-flop circuit set at the rise of the respective synchronizing pulses constituting the composite synchronizing signal, and reset by an output from the reset circuit, thereby obtaining said reproduced composite synchronizing signal containing a reproduced continuous vertical synchronizing pulse obtained by equally broadening the width of respective pulses included in the composite synchronizing signal to an extent at least larger than the width of the splits by which the vertical synchronizing pulse included in the composite synchronizing signal is previously divided at a time interval equal to half the period of a horizontal synchronizing pulse; and a device for extracting the reproduced continuous vertical synchronizing pulse from the reproduced composite synchronizing signal.

2. A vertical synchronizing pulse-extracting apparatus according to claim 1, wherein the first counter circuit consists of first and second flip-flop circuits connected in series to each other; and the reset circuit is supplied with the first clock pulses, a set output from the first flip-flop circuit and a set output from the second flip-flop circuit.

3. A vertical synchronizing pulse-extracting apparatus according to claim 1, wherein the device for extracting the vertical synchronizing pulse from the reproduced composite synchronizing signal comprises a logical AND circuit supplied with the reproduced composite synchronizing signal and second clock pulses, thereby giving forth said second clock pulses for lengths of time corresponding to the widths of the respective pulses included in the reproduced synchronizing pulses; a second counter circuit designed to commence the counting of second clock pulses at the rise of the respective reproduced synchronizing pulses constituting the reproduced composite synchronizing signal, to be reset at the fall of said respective synchronizing pulses and to continue the counting of second clock pulses until said second counter circuit is thus reset; and a logical AND circuit connected to the second counter circuit so as to generate a pulse synchronizing with the reproduced veritical synchronizing pulse when the second counter circuit has counted a prescribed number of second clock pulses.

4. A vertical synchronizing pulse-extracting apparatus according to claim 3, wherein the second counter circuit consists of first, second and third flip-flop circuits connected in series to each other; and the logical AND circuit for producing said vertical synchronizing pulse is supplied with an output from another logical AND circuit for giving forth said second clock pulses, a set output from the first flip-flop circuit, a set output from the second flip-flop circuit and a reset output from the third flip-flop circuit.

5. An apparatus for extracting a vertical synchronizing pulse from a composite synchronizing signal included in a video signal, comprising a synchronizing signal-separating circuit for separating a composite synchronizing signal from a video signal; a device for providing a reproduced composite synchronizing signal which comprises a differentiating circuit for differentiating the respective synchronizing pulse constituting the composite synchronizing signal, a monomultivibrator coupled to the differentiating circuit and generating an output pulse continuously for a prescribed length of time starting with the fall of said synchronizing pulses and a logical OR circuit supplied with an output from the monomultivibrator and the composite synchronizing signal, thereby obtaining said reproduced composite synchronizing signal containing a reproduced continuous vertical synchronizing pulse obtained by equally broadening the width of respective pulses included in the composite synchronizing signal to an extent at least larger than the width of the splits by which the vertical synchronizing pulse included in the composite synchronizing signal is previously divided at a time interval equal to half the period of a horizontal synchronizing pulse; and a device for extracting the reproduced continuous vertical synchronizing pulse from the reproduced composite synchronizing signal.

* * * * *